April 4, 1950 J. D. CHRISTIAN 2,503,027
GEAR REDUCTION UNIT
Filed May 31, 1947
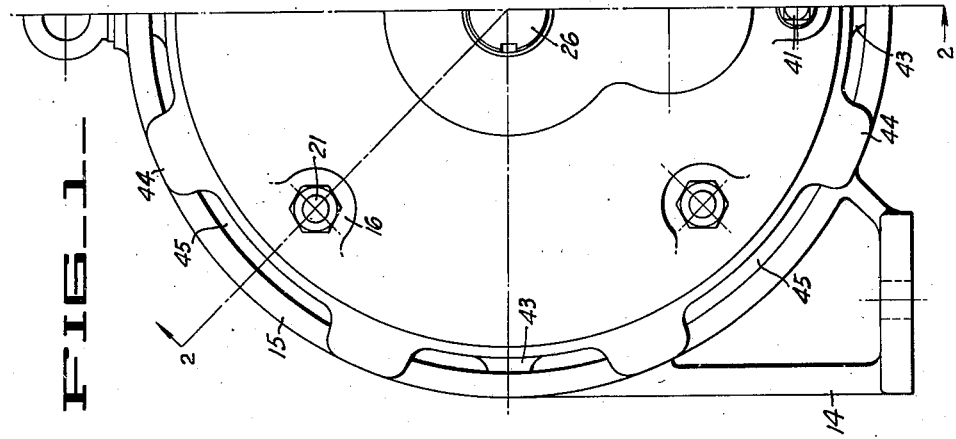
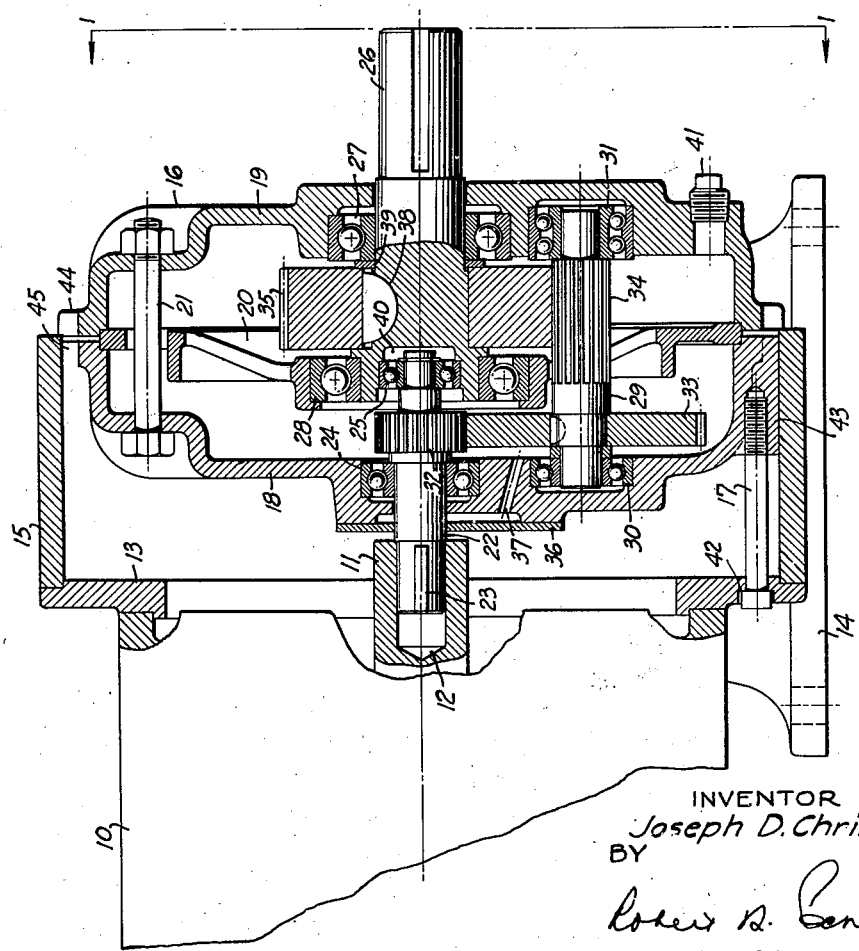
INVENTOR
Joseph D. Christian
BY
Robert B. Bennoff
ATTORNEY Patented Apr. 4, 1950

2,503,027

UNITED STATES PATENT OFFICE 2,503,027

GEAR REDUCTION UNIT

Joseph D. Christian, San Francisco, Calif.

Application May 31, 1947, Serial No. 751,556

10 Claims. (Cl. 74—421)

This invention relates to speed reduction gear units for electric motors.

Ordinary electric motors seldom revolve at the rate of speed required by the machine they are to drive, the speed of rotation usually being in excess of that required. Motors especially built for slow speed are excessively costly and bulky for most applications. Further, a standard line of motors of a particular horsepower and speed of rotation will be called upon to drive machinery requiring to be driven at widely different rates of speed.

To meet this situation, there have been developed reduction gear units designed to be mounted upon or in conjunction with conventional motors to provide the desired speed. The input shaft is driven by the shaft of the motor and the arrangement of gears is such as to provide the desired rate of rotation of the output shaft at the required horsepower. It is in this class of devices in which the improvement constituting my invention lies.

It is an object of my invention to provide a speed reduction gear unit which when applied to a motor will provide the smallest possible overall length of motor and speed reducer.

A further object is to provide a structure of the class described comprising a complete cartridge containing the gears and shaft arrangement and applicable without change to a wide variety of motors.

A still further object is to provide in a device comprising a motor, gear reduction unit, and support the utmost in flexibility with regard to mounting.

In the drawings forming a part of this description, Figure 1 is a partial end view of the device of my invention mounted upon a motor, taken in accordance with the line 1—1 of Figure 2.

Figure 2 is a section along line 2—2 of Figure 1.

Reference numeral 10 is applied to the motor shown partially in Figure 2. In mounting my reduction gear device upon the motor, the end bell is removed and the shaft 11 cut short and provided with a keyed bore 12.

An adapter ring 13 designed for the particular motor is mounted in place of the end bell and may be secured by the bolts or nuts with which the end bell was previously secured. Support for the entire device is supplied by a casting or welded unit having a base section 14, formed ordinarily with a flat parallel to the axis of casing 15 but otherwise as desired, and a cylindrical casing 15 which fits the adapter ring 13.

The gear cartridge, referred to generally at 16, is secured into the cylindrical section 15 by four cap screws 17, which pass through holes in ring 13. The arrangement is such that the cap screws 17 hold the cylindrical portion 15 clamped between the cartridge and the motor (adapter 13).

The gear cartridge comprises two outer walls 18 and 19 and an internal spider or support 20, the whole being secured together in this instance by four bolts 21, spider 20 being clamped between walls 18 and 19 as shown in Figure 2.

Input shaft 22 enters the bore 12 of motor shaft 11 and a driving relation is secured by a key 23. Bearings 24 and 25, carried respectively in wall 18 and in a bore 40 in output shaft 26, support input shaft 22, which acts as an end bearing for motor shaft 11. Output shaft 26 is carried by bearings 27 and 28, carried respectively in wall 19 and spider 20.

A countershaft 29 is carried on bearings 30 and 31 in walls 18 and 19 respectively. Output shaft 26 is driven by input shaft 22 through the gear train 32, 33, 34 and 35, these gears being formed upon or secured to the various shafts involved, as is common in the art.

A sealing plate 36 prevents loss of oil around shaft 22, there being a passage 37 provided to return any oil which reaches this plate back to the body of the cartridge. A key 38 is shown securing gear 35 to output shaft 26 and a spacing ring 39 aids in securing the output shaft against end play.

In order to secure the greatest possible compactness of design, I have placed the input shaft bearing 25 in a socket 40 bored into the end of the output shaft 26. An advantage here, since the two shafts rotate in the same direction, is that the effective speed of the bearing 25 is reduced enough to allow the use of a smaller bearing for a given load. The arrangement may be reversed, but ordinarily would be as shown, as the output shaft usually requires a larger bearing than does the input shaft.

The lower portion of the cartridge 16 constitutes an oil reservoir and a plug 41 is provided for draining purposes.

Center lines of the motor, adapter ring, inner and outer diameters, casing, cartridge, input and output shafts are all coincident. It will be noted that by virtue of the construction described, the motor may be positioned in several different positions with relation to the cartridge, and that the motor and cartridge may be clamped upon the casing 15 in any of an infinite number of positions. This provides a possibility of securing the base to wall, floor, or ceiling, the cartridge in such fashion that the oil plug 14 and countershaft gear 33 are at the bottom, and the motor in such position that its oil cups, electric box, etc., are conveniently located. I have thus achieved complete flexibility in a device of this character. Instead of four as shown, a larger number of mounting bolts may be used. Mounting bolts (cap screws) 17 pass through holes 42 in ring 13 and screw into bosses 43 formed on wall 18 of the cartridge. These bosses are machined concentrically with the bearing bores for shafts 22 and 26. If desired, corresponding bosses may be formed internally of casing 15 for the mounting bolts to pass through. Or the casing may include provisions for securing motor (adapter ring 13) and cartridge separately, each in a plurality of positions relative to the base. The flange 44 of the cartridge may be whole or may be cut away at spaced points to permit circulation of air over the cartridge and through the motor through openings 45.

Another virtue of the present construction is that a standard line of cartridges having various gear ratios and horsepower ratings may be carried in the dealer's stock and applied to any manufacturer's motor, the only element which must be custom-made being the adapter ring 13.

Since the end bell of the motor has been removed, I effectively utilize the greater portion of the volume previously occupied by it. One of the results of the construction described is that I am enabled in a space of approximately 120% of that occupied by the motor alone to provide a gear reduction unit in conjunction with the motor.

I claim:

1. In combination, a motor having a shell, an adapter ring secured to the shell, a casing having a flat mounting base and an open ended cylindrical portion the axis of which is parallel to the plane of the flat base, and a gear cartridge of cylindrical outline, said adapter ring and said cartridge being secured to said cylindrical casing by a plurality of equidistantly spaced securing means, whereby the motor and the cartridge may each be secured to the casing in a plurality of positions with respect to each other and the base.

2. In a gear reduction unit of the type described, a motor adapter ring, a casing including a base and a cylindrical section adapted to be secured to the adapter ring at its rear and to a gear cartridge at its front, a self-contained gear cartridge and means for securing said ring and cartridge to said casing, said cartridge comprising front and rear walls and a center support, the three being secured together and establishing an oil-tight enclosure, aligned first and second shafts having first bearings in the front and rear walls, second bearings for one of said shafts carried by said center support and for the other of said shafts carried within the first mentioned one of said shafts, a parallel counter shaft carried by bearings in said walls, and gearing on said shafts whereby one of said first and second shafts is driven by the other, one of said first and second shafts supporting and being driven by the shaft of said motor.

3. In a device of the type described, a complete and self-contained cartridge of cylindrical outline comprising front and rear walls, a center support secured solely by being clamped between the walls, means securing the walls and support together, two aligned shafts whose axes coincide with the axis of the cartridge and protruding one through each wall, first bearings for each shaft in the wall through which said shaft protrudes, second bearings for one of said shafts in said center support, second bearings for the other of said shafts socketed in the first of said shafts, and a gear train whereby one shaft drives the other.

4. A self-contained and complete gear reduction cartridge adapted for mounting cooperatively with respect to a rotor shaft in an electric motor, said cartridge comprising front and rear walls and a center support, the three being secured together and establishing an oil-tight enclosure, aligned first and second shafts having first bearings in the front and rear walls, second bearings for one of said shafts carried by said center support and for the other of said shafts carried within the first mentioned one of said shafts, a parallel counter shaft carried by bearings in said walls, and gearing on said shafts whereby one of said first and second shafts is driven by the other.

5. In combination, a motor, a support having a mounting base and a cylindrical section, a gear reduction cartridge, and a matched plurality of cooperative means on the motor and cartridge for securing the motor, the support, and the cartridge together by clamping the cylindrical section of the base between the motor and the cartridge.

6. In combination, a casing having a mounting base and an open ended cylindrical portion, a motor with a shell including a circular portion adapted to be secured to the casing, and a gear cartridge of cylindrical outline adapted to fit within at least a portion of said cylindrical casing portion, said circular portion of said motor shell and said cartridge being secured to said cylindrical casing by a plurality of equidistantly spaced securing means to secure the motor and the cartridge selectively to the casing in any selected position with respect to each other and to the base.

7. In combination, a motor having a shaft and a shell including a circular face for mounting the motor, a casing having a base portion and having a first circular portion, an adapter ring fitting the circular face on the motor shell and the first circular portion on the casing, means for securing the motor to said ring, a speed change device having a power input shaft adapted to be connected to and driven by said motor shaft and a coaxial power output shaft driven through speed change means from said input shaft, a casing for supporting the power input shaft, the speed change means and the power output shaft, and means for mounting the motor and the casing cooperatively with respect to one another and in any selected one of an infinite number of positions with respect to each other and to the mounting means, said means comprising a shell having means thereon for securing the shell on a fixed support, said shell being adapted to receive the ring on one side and the casing on the other side of the shell, and means for drawing the ring and casing together to clamp them together against rotation on the shell and in any position desired about the shell axis.

8. In combination, a motor having a shaft and a shell including a circular face for mounting the motor, a casing having a base portion and having a first circular portion, an adapter ring fitting the circular face on the motor shell and the first circular portion on the casing, means for securing the motor to said ring, a speed change device having a power input shaft adapted to be connected to and driven by said motor shaft and a coaxial power output shaft driven through speed change means from said input shaft, a cylindrical casing for supporting the power input shaft, the speed change means and the power output shaft, and means for mounting the motor and the casing cooperatively with respect to one another and in any selected one of an infinite number of positions with respect to each other and to the mounting means, said means comprising a shell having means thereon for securing the shell on a fixed support, said shell being adapted to receive the ring on one side and the cylindrical casing on and partially within the other side of the shell, and means for drawing the ring and casing together to clamp them together against rotation on the shell and in any position desired about the shell axis.

9. In combination, a base adapted to be secured to a fixed support and having a ring-like casing thereon; a motor having a stator, a rotor mounted on a shaft, and a generally cylindrical shell surrounding the stator, said motor shell being adapted to be mounted on the ring-like casing in any position of rotative adjustment about the axis of the rotor shaft; a speed change device including a casing having mounted and contained therein an input shaft, an output shaft coaxial with the input shaft, and speed change means between such shafts, said casing being adapted to be mounted on the ring-like casing in any position of rotative adjustment about the common axis of the input and output shafts; and means for securing the motor and the casing together with the ring-like casing clamped therebetween with the axis of said shafts in alignment in an infinite number of rotative positions of the motor and the casing about the ring-like casing.

10. In combination, an electric motor having a shell and a rotor shaft supported at one end in the shell and having its other end extending freely from the other end of the shell; a self-contained and complete gear reduction cartridge adapted to be driven by the motor, comprising front and rear walls and a center support, the three being secured together and establishing an oil-tight cartridge enclosure, aligned first and second shafts having first bearings in the front and rear walls, second bearings for one of said shafts carried by said center support and for the other of said shafts carried within the first mentioned one of said shafts, the other end of said motor shaft being rigidly mounted and supported in said other shaft, a parallel counter shaft carried by bearings in said walls, and gearing on said shafts in said cartridge connecting said shafts.

JOSEPH D. CHRISTIAN.

REFERENCES CITED

The following references are of record in the file of this patent:

UNITED STATES PATENTS

| Number | Name | Date |
| --- | --- | --- |
| 1,820,061 | Flagg | Aug. 25, 1931 |
| 1,887,560 | Mathews | Nov. 15, 1932 |
| 1,971,968 | Schmitter | Aug. 28, 1934 |
| 2,170,548 | Christian | Aug. 22, 1939 |

FOREIGN PATENTS

| Number | Country | Date |
| --- | --- | --- |
| 132,606 | Germany | Nov. 15, 1932 |
| 344,143 | Italy | Oct. 24, 1936 |
| 361,140 | Italy | July 13, 1938 |